Dec. 1, 1925.  
C. A. HULTQUIST  
PNEUMATIC DRILL  
Filed July 31, 1922
1,563,632
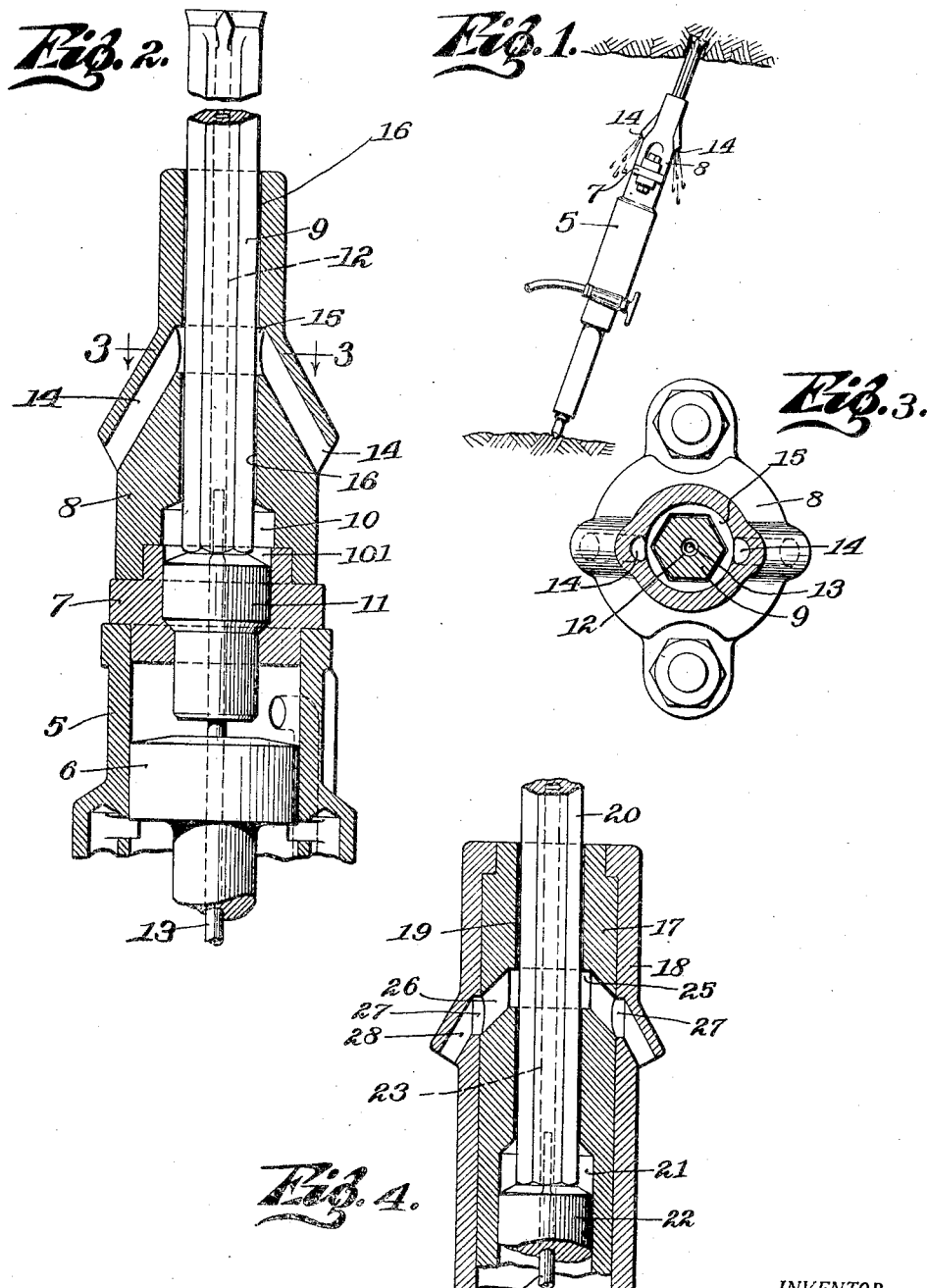
INVENTOR.  
Charles A. Hultquist,  
BY Lyon & Lyon  
ATTORNEYS.

Patented Dec. 1, 1925.

1,563,632

UNITED STATES PATENT OFFICE.

CHARLES A. HULTQUIST, OF LOS ANGELES, CALIFORNIA.

PNEUMATIC DRILL.

Application filed July 31, 1922. Serial No. 578,681.

*To all whom it may concern:*

Be it known that I, CHARLES A. HULTQUIST, a citizen of the United States, residing at Los Angeles, in the county of Los Angeles and State of California, have invented a new and useful Pneumatic Drill, of which the following is a specification.

This invention relates to drills of the type employing compressed air to operate them, and the invention relates more particularly to the construction of the chuck end of the drill.

With the types of drills now in common use, it is customary to either maintain air pressure in the anvil chamber or to provide ports leading from said anvil chamber to the exterior of the drill to permit escape of air from said chamber. When ports are not provided in the anvil chamber and the pressure is allowed to accumulate, the mud, grit and water that run down the drill steel are sprayed upon the operator of the tool. Besides being unpleasant to the operator the spray of water, etc., extinguishes his candle light. To overcome this disadvantage in the operation of the tool, the second noted construction has been heretofore provided, i. e., ports have been provided leading from the anvil chamber so that the air leaking past the anvil will find exit from the anvil chamber through said ports instead of at the outer end of the bore of the chuck. This second construction also has its disadvantage since, when the pressure is thus relieved in the anvil chamber, mud and water readily find their way past the drill steel into said chamber and the mud accumulates between the anvil and the head end of the drill steel and cushions the blow of the anvil upon the drill steel.

An object of the invention is to overcome the mud and water spraying from the end of the tool, without the heretofore necessary and objectionable alternative of permitting cushioning of the blow of the anvil upon the drill steel. I do this in a very satisfactory manner by providing a port or ports in the chuck between the anvil chamber and the outer end of the chuck, said ports leading from the bore of the chuck to the periphery thereof so as to discharge at an intermediate point of the chuck the water and mud that work inwardly between the drill steel and the chuck and the air that escapes from the anvil chamber between the drill steel and the chuck. Thus, the pressure is allowed to build up in the anvil chamber so that the mud and water cannot work their way into said anvil chamber to cushion the blow of the anvil upon the drill steel. Also, because of the water and mud being allowed to enter the bore of the chuck, said water and mud are not sprayed from the end of the chuck upon the operator.

The accompanying drawings illustrate several embodiments of the invention;

Figure 1 is a longitudinal view of a pneumatic drill embodying the invention, the same being indicated in operating position and being, in this instance, of a type termed a "stope drill".

Fig. 2 is an enlarged longitudinal mid section of the upper portion of the drill shown in Figure 1.

Fig. 3 is a plan view partly in section from the line indicated by 3—3, Figure 2.

Fig. 4 is a view similar to Figure 2 of a modified form of the invention.

In the form of the invention shown in Figures 1 to 3 inclusive, there is indicated a cylinder 5 and a piston 6 working in said cylinder. The front cylinder head is indicated at 7 and is inserted between the cylinder 5 and a chuck 8. In the chuck 8 is a drill steel 9. The anvil chamber is indicated at 101 in the head 7 and at 10 in the chuck 8, and an anvil 11 is indicated in said chamber. The drill steel is provided with a longitudinally extending duct 12 supplied with water by a water tube 13 which extends through the piston 6 and anvil 11 into the bore 12 of the drill steel.

The chuck 8 is provided between the anvil chamber 10 and its outer end with a port or ports 14 preferably leading from an annular recess or enlargement 15 of the bore 16 of the chuck. Preferably the ports 14 extend aslant in a direction to discharge the water and mud from the bore 16 downwardly along side of the cylinder 5.

In practical use the piston 6 will be operated in a manner well understood in this art to strike the anvil 11 which in turn drives the drill steel 9 into the rock being operated on. Air finds its way from the cylinder 5 into the anvil chamber 10 and maintains sufficient pressure therein to prevent water and mud working down along the drill steel below the ports 14, said water and mud, together with air leaking past the drill steel, finding exit from the bore 16 by way of the ports 14. Said ports being aslant, as described, direct the water, mud and grit alongside of the cylinder 5 so that the operator standing a slight distance from the drill will avoid being showered with said water and mud.

Now referring more particularly to the modification illustrated in Figure 3, the difference in construction over that shown in Figures 1 to 3 is that required in a tool of the type in which the chuck is rotated, said chuck comprising a bushing 17 and an outer member 18. Any well known means may be employed for rotating the bushing and, since such means are well understood in this art, they need not be illustrated and described herein, especially in view of the fact that the invention does not lie in such means. The bore of the chuck is indicated at 19 and the drill steel at 20. The bore 19 opens into an anvil chamber indicated at 21 in the chuck bushing 17. In the anvil chamber 21 is an anvil 22. The water duct of the drill steel is indicated at 23 and is supplied with water by a water tube 24 the same as in Figure 2. The bore 19 forms an enlargement or annular recess 25 from which leads a port or ports 26. The outer ends of the ports 26 communicate with an annular recess 27 in the bore of the chuck member 18 and leading from the recess 27 is a port or ports 28. Preferably the ports 26, 28 are aslant so as to direct air, water, mud and the like alongside of the cylinder.

The operation of the modification illustrated in Figure 4 is substantially the same as for the tool shown in Figures 1 to 3, though the chuck bushing 17 will be rotated by any well known means, not shown, and the water, mud and air will find exit from the bore 19 through the ports 26, recess 27 and ports 28.

From the foregoing it will be clear that, though the invention is of a comparatively simple nature, it overcomes the objectionable cushioning of the anvil blows and at the same time avoids the annoyance incident to the use of drills in which the anvil chambers are left unported and the air escapes at the outer end of the chuck bore.

I claim:

A pneumatic drill comprising a cylinder, a piston working in the cylinder, a chuck connected with the cylinder and having an anvil chamber therein, an anvil for the anvil chamber projecting into the bore of the cylinder, air leaking from the cylinder into the anvil chamber to maintain pressure above atmospheric in the anvil chamber, and a drill steel engaging the chuck and having a duct for conveying water to the hole that is being drilled, the anvil chamber being closed against escape of air therefrom excepting past the drill steel and the escaping air preventing sludge from running down the drill steel into the anvil chamber, and the chuck being provided with an exhaust port opening from its bore to the atmosphere at a point between the outer end of the chuck and the anvil chamber to permit discharge of air and sludge from the bore of the chuck.

Signed at Los Angeles, California, this 21st day of July 1922.

CHARLES A. HULTQUIST.